METHOD OF CURING MAGNETIC TAPE BINDER COMPRISING BUTADIENE-ACRYLONITRILE AND PHENOLIC RESIN WITH SUBATOMIC RADIATION

Filed Aug. 26, 1959

INVENTORS
JOHN A. GRIESEMER
JAMES P. TARWATER
BY Carl C. Kling
ATTORNEY 3,104,983
Patented Sept. 24, 1963

3,104,983

METHOD OF CURING MAGNETIC TAPE BINDER COMPRISING BUTADIENE - ACRYLONITRILE AND PHENOLIC RESIN WITH SUBATOMIC RADIATION

James P. Tarwater, Pittsburgh, Pa., and John Anthony Griesemer, Poughkeepsie, N.Y., assignors to International Business Machines Corporation, New York, N.Y., a corporation of New York Filed Aug. 26, 1959, Ser. No. 836,169
1 Claim. (Cl. 117—93.31)

This invention relates to magnetic tape manufacturing, and more particularly to a method and means for curing magnetic tapes having a curable binder formulation including a rubbery polymer by means of subatomic radiation.

Magnetic tapes have become a standard recording medium for sound and for alphabetic and numeric data because of their reliability, convenience and ease of storage of large amounts of information. The recording industry has made advances in the electronic circuits to read from and write on magnetic tape, in the mechanical means to start, stop and drive tape past the read-write head at higher and higher speeds, and in the magnetic tape itself, which must be capable of accurate record retention as well as of withstanding the stress of high-speed operation without breaking or wearing out.

One magnetic tape which has demonstrated excellent wearability as well as high fidelity is a thin coating of finely-divided acicular $Fe_2O_3$ magnetic particles in a curable binder composed of phenolic resin and a copolymer of butadiene and acrylonitrile upon a suitable plastic ribbon. Such a magnetic tape is described is U.S. Patent 2,989,415, June 20, 1961, Paul V. Horton and Robert S. Haines, Magnetic Recording Medium and Method of Making the Same, Serial Number 703,751, filed December 19, 1957, now U.S. Patent No. 2,989,415, of common assignee with the instant application.

The Horton and Haines patent discloses a magnetic recording medium comprising a non-magnetic backing, and a firmly adhering attached magnetic coating, said coating being a uniform dispersion of magnetic particles in a binder, said binder consisting essentially of a cured blend of about 90–30 parts of an elastomeric copolymer of about 55–85 parts of butadiene and about 45–15 parts by weight of acrylonitrile, and about 10–70 parts by weight of an uncured thermosetting resinous condensate of an aldehyde and a phenol.

Oven-curing of the tape for several days to provide suitable wear characteristics has been the practice. Oven-curing, however, is time consuming and therefore expensive, and subject to error, especially where the curing cycle lasts several days for completion, where temperatures must be held low to prevent damage to the plastic web, and where the atmosphere must be controlled to prevent chemical changes such as oxidation. Properly oven-cured magnetic tapes, although greatly outwearing similar uncured magnetic tapes, retain a slight tendency to stick to magnetic read-write heads which decreases tape life by causing particle loss and occasional breakage of worn tapes.

Subatomic radiation is known to effect changes in physical arrangement of atomic and subatomic particles in chemical compounds. See, for example, Charlesby: "How Radiation Affects Long-Chain Polymers," Nucleonics, June 1954, pp. 18–25. The exact pattern and explanation of the change in atomic or molecular structure is not explained; empirical results may be detrimental, advantageous, or inconclusive. Magnetic tapes having ordinary binders are not appreciably affected by radiation unless dosage is sufficient to damage the plastic ribbon or the binder.

Information-packing advances, and more precise recording and reading techniques which take advantage of high-density information-packing are reaching limits in present magnetic tapes due to particle size and magnetic layer thickness. As new, finer magnetic particles are developed and very thin magnetic layers of one particle thickness are used, binder formulations must be capable of holding the particles firmly, without particle loss or tape-to-head stick.

It is an object of this invention to provide a magnetic tape curing method utilizing subatomic radiation which method is speedy, accurate and inexpensive when applied to mass production.

It is a further object of the invention to provide a method utilizing subatomic radiation to selectively cure the rubbery component of a magnetic tape binder without affecting other components, the magnetic particles nor the web.

It is another object of the invention to provide improved means utilizing subatomic radiation for manufacturing long-wearing magnetic tapes made up of a web bearing a layer of magnetic particles in a curable binder including a rubbery polymer which is particularly susceptible to radiation-induced cross-linkage curing.

The foregoing and other objects, features and advantages of the invention will be apparent from the following more particular description of preferred embodiment of the invention, as illustrated in the accompanying drawings.

Figure 1:
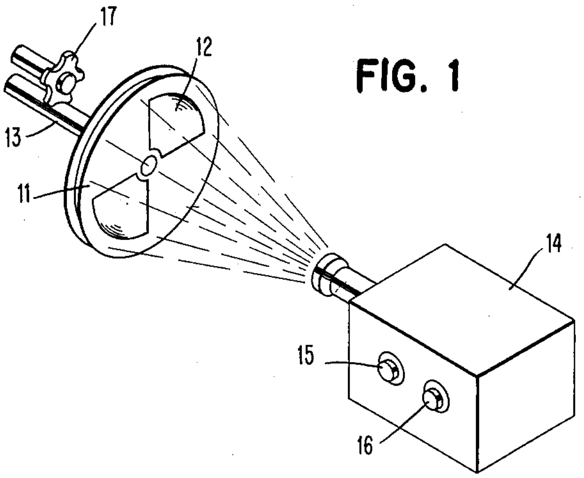
FIG. 1 is a diagram of batch-process apparatus for performing the invention.

*FIGURE 1—Batch Process Apparatus*

A reel 11 of magnetic tape 12 is mounted on spindle 13 and exposed to radiation from radiation generator 14. Timer 15 controls the duration of radiation; control 16 varies the intensity. Suitable shielding (not shown) is provided to protect the operator. Reel 11 is preferably made up of a radiation-permeable plastic; it may however, be open faced metal, or even of homogenous semi-opaque material, in which case a heavier dosage is required.

The radiation generator 14 may be an X-ray machine, an electron accelerator, or radioactive element such as radium or cobalt 60, or other industrial radiation source suitably focussed and shielded to provide measurable dosages of radiation substantially perpendicular to the reel of tape and traversing the whole reel, substantially planar with each incremental area of tape. Absorption of radiation by the magnetic particles and other components creates shadow areas where dosage is light. Reel 11 is therefore continuously moved during irradiation by wobble cam 17; the reel may be reversed on spindle 13 and re-exposed to equalize radiation dosage. Since the magnetic particles absorb radiation in quantity, this type of exposure is most effective on narrow-ribbon tapes having very thin magnetic layers. As ultra-fine magnetic particles for thin layers are developed, this absorption will cease to be a problem. Particle retention problems, however, will multiply since in such a thin layer loss of a single particle may result in loss of an information bit.

Figures 2, 3, 4:
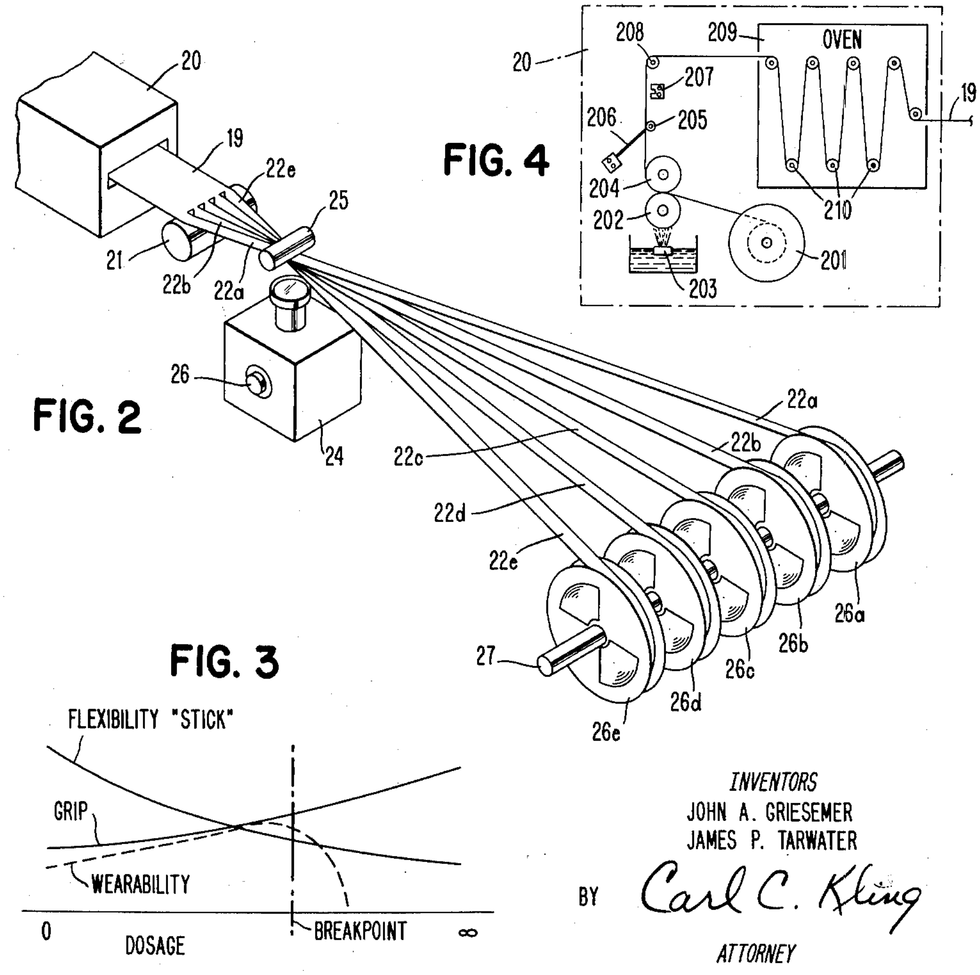
FIGS. 2 and 3 illustrate continuous process apparatus for manufacturing magnetic tapes according to the invention.
FIG. 4 is a graph of magnetic tape wear parameters as a function of radiation dosage.

*FIGURES 2 and 3—Continuous Process Apparatus*

A wide band of freshly prepared magnetic tape stock 19 is prepared by the manufacturing process apparatus 20, which includes supply roll 201, coating roller 202, and fountain feed 203 which keeps roller 202 supplied with magnetic particle-binder mix in a solvent. The tape stock feeds between coating roller 202 and backup roller 204 where a rough layer of magnetic coating is applied. The rough layer is smoothed by smoothing blade 206 as the tape passes over backup roller 205, after which the particles are aligned by magnet 207. The tape then passes over rollers 208 into oven 209, which contains festooning rollers 210 to enclose a large length of tape in the restricted volume of oven 209. The uncured, freshly prepared tape 19 then passes out of the oven and is ready for radiation curing. The wide tape, as it passes slitting knives 21, is divided into ribbon-width tapes **22*a*–22*e*, which are supplied in a pile of layers to be irradiated by radiation generator 24. The duration of irradiation of a given increment of tape depends on the time required for the tape to pass the radiation generator, i.e., the speed of the manufacturing apparatus and the size of the radiation cone. Tapes 22*a*–22*e* cross over each other, arranging themselves in a compact pile at the radiation generator 24, which irradiates the surface of the top layer and penetrates the pile to irradiate lower layers. The tapes 22*a*–22*e* are then wound on takeup reels 26*a*–26*e*, which are separately spring-driven on shaft 27 which may be curved to keep reels 26*a*–26*e* in line with tapes 22*a*–22*e***.

Radiation generator 24 may be an X-ray machine, radio-active element, Van de Graaff accelerator or other radiation source suitably focussed and shielded to provide measurable dosages of radiation substantially perpendicular to each incremental area of layers of tape as they pass the radiation source. The compact stacking of tape layers adjacent the radiation generator permits the use of a sharply focussed low-power generator, but a high power generator is necessary for high-speed in-line radiation of tape.

Should the manufacturing process yield a large number of ribbons of tape, a second radiation generator may be placed to irradiate the pile of tapes from below, or duplicate radiation generators may be used, each to irradiate a portion of the ribbons sliced from band 19. Absorption of radiation by the tape components, especially the magnetic material, reduces effectiveness of a low power source if more than five layers of tape are piled.

*FIGURE 4—Wearability*

The freshly prepared magnetic tape, as yet uncured, is irradiated as indicated in the following chart of examples:

| Ex. | Source | Power | Optimum duration | Approach | Tape attitude |
|---|---|---|---|---|---|
| 1 | X-ray | 50 kv.-30 ma. | 6 minutes | Surface | 5 layers. |
| 2 | do | do | 100 minutes | Edge | Reeled. |
| 3 | Cobalt 60 | | 300 minutes | do | Do. |
| 4 | Radium | | 1 second | Surface | 1 layer. |
| 5 | Electron accelerator. | | 1 second | do | Do. |

The uncured binder of phenolic resin and butadiene-acrylonitrile copolymer is quite flexible but has limited gripping power. Magnetic particles, loosely gripped, are subject to being pulled loose as tape is manipulated, especially by sticking to the magnetic read-write head after a rest. Curing increases gripping power but decreases flexibility. Wearability is a function of binder gripping power up to a maximum; for a particular use, wearability is maximized in the range in curing where the binder is barely flexible enough to make the required turns without cracking. If further cured beyond the break point of brittleness, the binder breaks loose from the magnetic particles as the tape is pulled over sharp-angle bends in its path through the use machine; wearability of overcured tape approaches zero. The break point may be derived by calculating the flexibility required for the binder to negotiate the sharpest bend in the tape manipulator in which use is intended—experimental derivation, however, is much simpler.

Curing all the way to the break point is not usually desired since some tolerance is generally included. Radiation cured tapes, however, may be cured very close to the break point since there is very little continuing cure after radiation ceases.

The curing effect appears to be due to cross-linkages of long-chain polymers in the butadiene-acrylonitrile component, which increases as a function of radiation toward a maximum gripping power as cross-linkages multiply. The flexible long-chain linkages lose their identity, with resultant loss of flexibility. The phenolic resin component, magnetic particles, and web are not appreciably affected.

For the batch process, where a full reel is exposed, the most convenient and economical manner of adjusting the radiation source to the tape and desired amount of cure is to operate the radiation source at full power and control the duration of exposure.

For the continuous process, where exposure is a part of the manufacturing operation, it is most convenient to operate the manufacturing apparatus at full speed and control the energy of the radiation source. For a high-speed manufacturing apparatus, a high-power source is required.

A small dosage of subatomic radiation has some curing effect; the durations given in the examples are felt to be optimum economical dosages for the power sources named to provide best wearability characteristics in computer applications. Irradiation in greater doses does not surpass the break point for effective particle retention if kept within the range of 6–120 minutes (Example 1), 100–1000 minutes (Example 2), 300–3000 minutes (Example 3) or 1–60 seconds (Example 4). Massive overdoses are likely to damage the web and the phenolic component; small overdoses tend to cause particle loss due to lack of flexibility.

The optimum dosages given in the examples are for magnetic tape having a 1 mil layer of $Fe_2O_3$ particles in a binder of butadiene-acrylonitrile copolymer and phenolic resin on a 1 mil ribbon of polyethylene terepthalate. Thin film magnetic tapes are curable by much lighter dosages. The amount of radiation absorbed by the tape ranges from ½ to 2 megarads.

While the invention has been particularly shown and described with reference to preferred embodiments thereof, it will be understood by those skilled in the art that various changes in form and details may be made therein without departing from the spirit and scope of the invention.

What is claimed is:

The method of curing for improved wearability in an intended use a magnetic tape comprising a non-magnetic backing, and a firmly adhering attached magnetic coating, said coating being a uniform dispersion of magnetic particles in a binder, said binder consisting essentially of a cured blend of about 90–30 parts of an elastomeric copolymer of about 55–85 parts of butadiene and about 45–15 parts by weight of acrylonitrile, and about 10–70 parts by weight of an uncured thermosetting resinous condensate of an aldehyde and a phenol, such binder being of the type in which tape-to-head "stick" and flexibility diminish as the binder is cured and in which particle gripping power increases as the binder is cured, consisting of preparing five layers of such magnetic tape, providing continuous motion to the tape, and exposing the freshly-prepared moving layers of tape to subatomic radiation by a 50 kilovolt–30 milliampere X-ray source for six minutes, to provide absorption of .5 to 2.0 megarads to cure by cross-linking the butadiene-acrylonitrile component to the point where the flexibility is the minimum required by the intended use, and preventing further radiation exposure whereby neither the web, magnetic particles, nor the phenolic resin component exhibit change in characteristics.

References Cited in the file of this patent

UNITED STATES PATENTS

| | | |
|---|---|---|
| 2,711,901 | Von Behren | June 28, 1955 |
| 2,914,450 | Hammesfahr et al. | Nov. 24, 1959 |
| 2,956,904 | Hendricks | Oct. 18, 1960 |

FOREIGN PATENTS

| | | |
|---|---|---|
| 66,034 | France | Apr. 24, 1956 |